Figure 1:
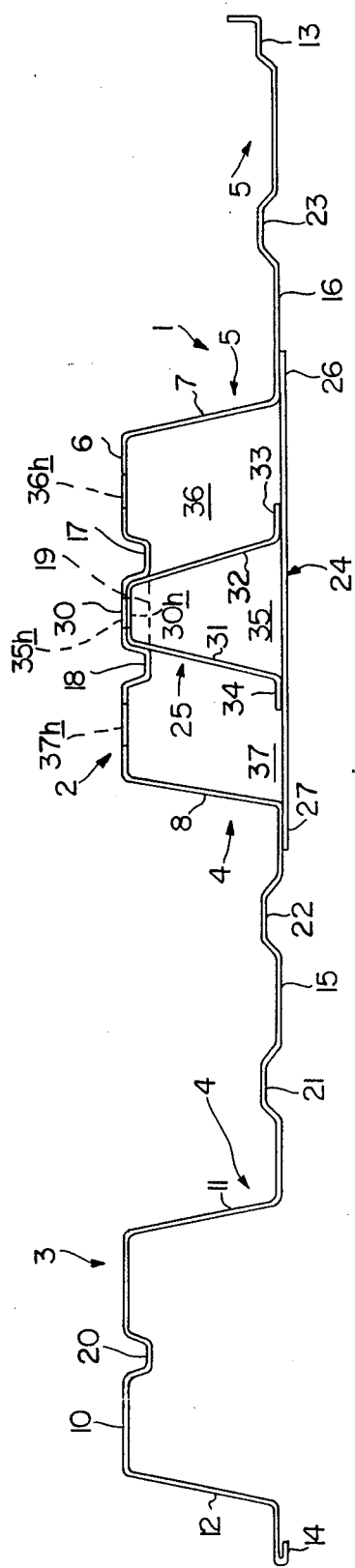

United States Patent [19]

Domigan et al.

[11] Patent Number: 4,965,972

[45] Date of Patent: Oct. 30, 1990

[54] COMBINED DECK UNIT AND CELLULAR RACEWAY

[75] Inventors: Charles N. Domigan, Coolville, Ohio; J. David Harmon, Vienna, W. Va.

[73] Assignee: Butler Manufacturing Company, Kansas City, Mo.

[21] Appl. No.: 390,246

[22] Filed: Aug. 7, 1989

Related U.S. Application Data

[63] Continuation of Ser. No. 216,235, Jul. 7, 1988, abandoned.

[51] Int. Cl.⁵ ............................................. E04F 17/08
[52] U.S. Cl. ........................................ 52/221; 174/48
[58] Field of Search ................... 174/48; 52/221, 336

[56] References Cited

U.S. PATENT DOCUMENTS

| | | | |
|---|---|---|---|
| 4,593,507 | 6/1986 | Hartman | 52/221 |
| 4,682,456 | 7/1987 | Hartman et al. | 52/221 |
| 4,741,134 | 5/1988 | Stohs | 52/221 |

*Primary Examiner*—James L. Ridgill, Jr.
*Attorney, Agent, or Firm*—Frederick J. Olsson

[57] ABSTRACT

A combined deck and cellular raceway unit. The deck has at least a pair of parallel extending crests, each with a top member and a pair of webs together with a valley between the crests. The cellular raceway is formed by an assembly including a hat-shaped member mounted on a base, the assembly being placed inside one of the crests with its top wall engaging the underside of the crests and its base extending across the open end of the crest and welded to the deck unit.

8 Claims, 1 Drawing Sheet

COMBINED DECK UNIT AND CELLULAR RACEWAY

This application is a continuation of application Ser. No. 216,235, filed July 7, 1988 now abandoned.

This invention relates in general to sheet metal corrugated deck units for use in composite floor construction.

The invention contemplates a cellular raceway formed of a corrugated deck unit having blending side laps and an especially configured assembly associated solely with an individual crest, the assembly closing off the open end of the crest and forming multiple cells. The foregoing is in contrast to the conventional technique wherein a bottom plate having blending side laps spans the entire width of a deck unit and closes off all of the crests so that each crest becomes a single unit.

The advantages of the invention are: first, flexibility in selection of cellular raceway location in a floor is increased; second, the amount of steel necessary to create a multi-cell raceway is reduced; and third, the lateral size of a preset or afterset necessary to span all cells is reduced with consequent savings in material.

The invention will be described below in connection with FIG. 1 which is an end view of a composite deck unit and cellular raceway.

It will be understood that the units described herein are formed from sheet metal of appropriate gauge and with a length and width compatible with the particular application. Also, the profile of a unit is sufficient to explain the invention, and so the length is not shown.

In FIG. 1, a conventional deck unit 1 is roll formed from a sheet metal to include the spaced apart crests 2 and 3, the valley 4 between the crests and the partial valley 5. The crest 2 is formed by the top 6 and the webs 7 and 8 and the crest 3 formed by the top 10 and webs 11 and 12. The opposite edges of the deck unit are formed with side laps 13 and 14 for blending purposes. The valley 4 is formed by the webs 8 and 11 and the bottom 15. The partial valley 5 is formed by the web 7 and the bottom 16.

The top 6 has a pair of ribs 17 and 18 while the top 10 has a single rib 20. The bottom 15 has a pair of ribs 21 and 22 while the bottom 16 has a single rib 23.

In the particular deck unit described, the crests 2 and 3 have the same height and the crest 2 is wider than the crest 3. Thus, the crest 2 is aptly suited for conversion into a cellular raceway having three cells.

The assembly for converting the crest 2 includes a base member 24 and a hat-shaped member 25.

The base 24 extends across the mouth of the crest to close off the same. The edge areas 26 and 27 extend past the lower ends of the webs 7 and 8 and underneath the bottoms 15 and 16 where they are welded in place.

The hat-shaped member 25 has a top wall 30 and a pair of side walls 31 and 32.

The top of the hat section is nested between the ribs 17 and 18 with the top wall 30 engaging the underside of the top 6 and preferably welded thereto. The side walls 31 and 32 extend down to the base 24 where the feet 33 and 34 are welded thereto.

It will be evident that the sub-assembly and the crest 2 form a three-cell cellular raceway, the cell 35 being for power cable and the cells 36 and 37 being for communication cables.

The communication cells 36 and 37 are on opposite sides of the power cell 35.

For fabrication purposes, the base 24 and the hat-shaped section 25 are first welded together and then the assembly is put into position as shown and welded in place as described.

While in the configuration shown, the crest 2 is wider than the crest 3, it will be evident that the crests may be the same size and that an assembly may be employed in each crest to create two cellular raceways in a single deck unit.

The top 6 of the crest 2 may be formed with a single rib rather than the two ribs 17 and 18. This is indicated by the dotted lines 19. In such instances the height of the hat section is made compatible with the single rib.

It will be understood that the top 6 of the crest 2 is provided with holes or access 35h, 36h, and 37h openings to the power and communication cells and also that the top 6 is adapted to mount a preset over the openings 35h, 36h, and 37h to receive the various power and communication cables for transfer to the work section serviced by the preset. Also, it will be understood that the top wall 30 of the hat-shaped member or section 25 has a hole or access opening 30h which, for purposes of cable passage, is aligned with the hole or access opening 35h in the top 6 of the crest 2.

Further, it will be understood that the side laps 13 and 14 shown herein are representative. The laps may take other forms such as standing seam.

While we have used the terms power cell and communication cells in the above description, it will be understood that the trade sometimes designates these cells as being high tension and low tension.

In closing, it is to be noted that while we have shown a unit with a pair of crests, the invention contemplates a unit wherein there are more than two crests and, of course, with a commensurate number of full valleys.

We claim:

1. An elongated, combined deck and multicell cellular raceway unit, the unit to extend horizontally when in use:
the deck being formed by:
  (a) at least first and second parallel extending crests, each crest having a top member and a pair of webs respectively connected to opposite edges of the top member, the top member having a pair of communication cell openings and a power cell opening therebetween; and
  (b) a valley between the first and second crests, the valley being formed as by the facing webs of the first and second crests and by a bottom member connected to the facing webs; and
  (c) at least a partial valley formed by the other web of said first crest and by a bottom member connected to the other web;
the cellular raceway being underneath the deck and formed by:
  (d) side edges, each side edge formed into a configuration constituting a side lap;
  (e) a hat-shaped member including a top wall with a power cell opening and disposed on the underside and in engagement with the top of the first crest with the power cell opening in the top wall being in alignment with the power cell opening in the top member and the hat-shaped member also having first and second side walls connected to opposite sides of the top wall and extending toward and connected to said base member;
  (f) the base and the hat-shaped member forming a power cell; and (g) the base, the side walls of the hat-shaped member, the webs of the crest and the top member forming a pair of communication cell disposed respectively on opposite sides of the power cell.

2. The structure of claim 1 wherein the top of the second crest is provided with a pair of ribs and the top wall of the hat-shaped member is disposed between and in engagement with said ribs.

3. The structure of claim 1 wherein the top of the second crest is provided with a single rib and the top wall of the hat-shaped member is engaged with the underside of the single rib.

4. The construction of claim 1 when each side wall of the hat-shaped member has a foot engaging and welded to said base member.

5. The construction of claim 1 wherein the lateral width of the first crest is greater than the lateral width of the second crest.

6. An elongated, combined deck and multicell cellular raceway unit, the unit extending horizontally: the deck being formed by:
    (a) a plurality of parallel extending crests, each crest having a top member and a pair of webs respectively connected to opposite edges of the top member;
    (b) a plurality of valleys between adjacent crests, each valley being formed as by the facing webs of adjacent crests and by a bottom member connected to the facing webs;
    (c) a pair of partial valleys respectively adjacent to the two outermost crests, each partial valley being formed by a web of its adjacent crest and by a bottom member connected to the adjacent web; and
    (d) a pair of side laps respectively formed on each of said bottom members;
    (e) the top member of one of said crests having a pair of communication cell openings and a power cell opening therebetween;
the cellular raceway being underneath the deck and formed by:
    (f) a base mbmber extending across the open end of one of said crests and connected respectively to the webs thereof;
    (g) a hat-shaped member including a top wall with a power cell opening and disposed on the underside and in engagement with the top of said one crest with the power cell opening in the top wall being in alignment with the power cell opening in the top member of said one crest and also having first and second side walls connected to opposite sides of the top wall and extending toward and connected to said base member;
    (h) the base and the hat-shaped member forming a power cell; and
    (i) the base, the side walls of the hat-shaped member, the webs of said one crest and the top member of said one crest forming a pair of communication cells respectively disposed on opposite sides of the power cell.

7. In a combined deck and multicell cullular raceway unit:
a sheet formed with a plurality of crests and valleys and having side edges, each edge formed into a configuration constituting a side lap; and
a cellular raceway assembly underneath said sheet and comprising a base and a hat-shaped member connected to the base, the hat-shaped member being disposed inside of one of said crests and having a top wall engaged with the underside of the top of said one crest and the base extending across the open end of said one crest and being connected to the underside of said sheet, said one crest, and said assembly forming a three-cell cellular raceway comprising a pair of communication cells and a power cell therebetween; and
openings formed in the top of said crest and in the top of said hat-shaped member respectively open to said communication cells and said power cell.

8. In a combined deck and multicell cellular raceway unit, the unit extending horizontally:
a sheet formed with a plurality of crests and valleys and having side edges, each side edge formed into a configuration constituting a side lap; and
a cellular raceway assembly underneath said sheet and comprising a base and a hat-shaped member connected to the base, the hat-shaped member being disposed inside of one of said crests and having a top wall engaged with the underside of the top of said one crest and the base extending across the open end of said one crest and being connected to the underside of said sheet, said one crest, and said assembly forming a multicell cellular raceway comprising communication and power cells; and
openings formed in the top of said crest and in the top of said hat-shaped member respectively open to said communication and power cells.

* * * * *